(12) United States Patent
Krapf et al.

(10) Patent No.: US 8,976,055 B2
(45) Date of Patent: Mar. 10, 2015

(54) METHOD FOR OPERATING AN ELECTRICAL DEVICE AND ELECTRICAL DEVICE

(75) Inventors: Reiner Krapf, Reutlingen (DE); Heiko Braun, Leinfelden-Echterdingen (DE); Michael Mahler, Leinfelden-Echterdingen (DE); Christoph Wuersch, Wedenberg (CH); Wilfried Kaneider, Rankweil-Brederis (AU); Hartmut Dunger, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 12/808,645

(22) PCT Filed: Dec. 18, 2008

(86) PCT No.: PCT/EP2008/067913
§ 371 (c)(1),
(2), (4) Date: Sep. 22, 2010

(87) PCT Pub. No.: WO2009/077595
PCT Pub. Date: Jun. 25, 2009

(65) Prior Publication Data
US 2011/0032138 A1    Feb. 10, 2011

(30) Foreign Application Priority Data
Dec. 19, 2007 (DE) .......................... 10 2007 061 383

(51) Int. Cl.
*G01S 13/04* (2006.01)
*G01S 7/02* (2006.01)
(Continued)

(52) U.S. Cl.
CPC ................. *G01S 7/021* (2013.01); *G01S 7/023* (2013.01); *G01S 7/4004* (2013.01); *G01S 13/0209* (2013.01)
USPC ............................................ 342/22; 342/159

(58) Field of Classification Search
CPC .... G01S 13/0209; G01S 13/885; G01S 7/023
USPC ............................ 342/22, 27, 82, 85, 88, 159
See application file for complete search history.

(56) References Cited

U.S. PATENT DOCUMENTS 4,385,301 A * 5/1983 Tricoles et al. ................. 342/445
5,294,933 A * 3/1994 Lee et al. ....................... 342/159
(Continued)

FOREIGN PATENT DOCUMENTS

| CN | 1354871 | 6/2002 |
|---|---|---|
| CN | 1551511 | 12/2004 |
| EP | 1 983 353 | 10/2008 |

OTHER PUBLICATIONS

Miller et al. "RFI Suppression for Ultra Wideband Radar." *IEEE* vol. 33. No. 4. 1997. pp. 1142-1156.
(Continued)

*Primary Examiner* — John B Sotomayor
*Assistant Examiner* — Marcus Windrich
(74) *Attorney, Agent, or Firm* — Maginot, Moore & Beck LLP

(57) ABSTRACT

The invention relates to a method for operating an electrical device which during operation emits electromagnetic radiation at least temporarily, and to a method for operating a locating device for identifying objects. The method for operating an electrical device is characterized in that the presence of an external radiation source or radio communication service is detected. The invention also relates to an electrical device, especially a locating device comprising at least one UWB sensor, which device is operated according to the method of the invention.

14 Claims, 2 Drawing Sheets

(51) Int. Cl.
*G01S 7/40* (2006.01)
*G01S 13/02* (2006.01)

(56) References Cited

U.S. PATENT DOCUMENTS

| | | | | |
|---|---|---|---|---|
| 6,239,741 | B1 * | 5/2001 | Fontana et al. | 342/135 |
| 6,456,231 | B1 | 9/2002 | McEwan | |
| 6,983,245 | B1 | 1/2006 | Felstrom et al. | |
| 7,436,908 | B2 * | 10/2008 | You et al. | 375/340 |
| 7,683,828 | B2 * | 3/2010 | Stagliano et al. | 342/173 |
| 7,750,838 | B2 * | 7/2010 | Krapf et al. | 342/22 |
| 2002/0155811 | A1 * | 10/2002 | Prismantas et al. | 455/63 |
| 2003/0038741 | A1 * | 2/2003 | Greer | 342/13 |
| 2004/0027276 | A1 * | 2/2004 | Herman | 342/181 |
| 2007/0120731 | A1 * | 5/2007 | Kelly et al. | 342/159 |
| 2007/0188373 | A1 * | 8/2007 | Shirakawa et al. | 342/70 |
| 2007/0208495 | A1 * | 9/2007 | Chapman et al. | 701/117 |
| 2008/0012756 | A1 * | 1/2008 | Stagliano et al. | 342/26 R |
| 2009/0015459 | A1 * | 1/2009 | Mahler et al. | 342/22 |

OTHER PUBLICATIONS

Nezirovic et al. "Narrowband Interference Suppression in UWB Impulse Radar for Human Being Detection." *IEEE*. 2007. pp. 56-61.

* cited by examiner

METHOD FOR OPERATING AN ELECTRICAL DEVICE AND ELECTRICAL DEVICE

This application is a National Stage Application of PCT/EP2008/067913, filed 18 Dec. 2008, which claims benefit of Serial No. 10 2007 061 383.2, filed 19 Dec. 2007 in Germany and which applications are incorporated herein by reference. To the extent appropriate, a claim of priority is made to each of the above disclosed applications.

BACKGROUND

The invention relates to an electrical device, particularly to a device for detecting objects, for example, to a locating device and thereby particularly to a device comprising at least one ultra wideband (UWB) sensor.

In contrast to conventional narrow-band radio communication services, UWB sensor devices use a very large frequency range with, however, a relatively low power spectrum. The use of this large frequency range results in frequency ranges being covered, which are already used by existing radio communication services. Due to the low power spectrum of the UWB sensor devices and the narrow-band nature of the receivers of the existing radio communication services, the interference potential of the UWB sensor devices is very small. Said interference potential does, however, depend on the distance between the UWB sensor device and the narrow-band receiver. This interference can thereby be regarded as noise interference by the radio communication services. When the distance between said UWB sensor device and said narrow-band receiver is small, the interference potential can, however, exceed an admissible limit, and the transmitter of said UWB sensor device must be turned off to avoid an interference of the narrow-band device.

The interference potential of active narrow-band devices on UWB sensor devices is in such cases considerably larger because the total energy of the narrow-band transmitter is received by the wideband receiver of the UWB sensor device. Decreasing the distance between the two devices leads to said UWB sensor device not being able to receive its own signals and consequently to said UWB device no longer being able to operate and to it having to react to the interference. UWB devices in contrast to radio communication services do not, however, enjoy any protection from interference.

Suitable signal sources of a UWB sensor device are e.g.:
Pulse trains
Pseudo-noise (PN) sequences
Frequency modulated continuous wave (FMCW)
Stepped frequency continuous wave (SFCW)
Frequency-shift system The generation of pulse trains can be made by diodes (e.g. SR diode), a transistor or a transistor circuit. Pseudo-noise sequences can be generated by feedback shift registers (e.g. discrete design using gates, FPGA implementation, digital chip) or by a lookup table, respectively memory. The methods for signal generation correspond to the technical field.

The FMCW and frequency-shift method is an established method in the field of radar technology. In this case, a modulated signal is superimposed on a carrier frequency. This modulated signal simultaneously represents the measuring signal and is recovered after reception with the aid of a mixer.

It is the aim of the invention to be able to operate locating devices in the presence of radio communication services and to keep the disturbing electromagnetic interactions between said devices and services to a minimum or avoid them altogether. Within the scope of the invention, external high frequency signals and corresponding radio communication services, as, for example, mobile radio systems, are considered to be radio communication services.

SUMMARY

The device according to the invention includes at least one ultra wideband sensor (UWB sensor), particularly an ultra wideband radar sensor. A sensor, particularly a radar sensor, respectively an antenna, is to be understood in this context by a UWB sensor, respectively an "ultra wideband radar sensor". An ultra wideband electromagnetic signal, particularly a radar signal of this type, can be generated, respectively transmitted and/or received and/or evaluated using such a sensor. Especially an electromagnetic signal is thereby to be understood by an "ultra wideband (or UWB) radar signal", said signal having a useful frequency range with an average frequency in the frequency range of 1 GHz to 15 GHz and a frequency bandwidth of at least 500 MHz.

In the case of the method according to the invention, respectively of an electrical device operating according to said method, a search is made prior to or during the emission of a radio signal (e.g. radar signal of locating device) or during a pause in emission for potential interferers or radio communication services possibly interfered with by the radio signal. This occurs by the relevant useful frequency range of the UWB locating device being searched for active radio communication services. If no active radio communication service is in the vicinity, the locating device can emit its transmit signal with full (allowed) power; while in the case of an interfering radio communication service, measures must be taken on the one hand not to disturb said radio communication service during its reception phase and on the other hand an appropriate measure must be taken to counteract the influence of the preferred radio communication service on the measuring process of the locating device under consideration.

The degree to which the protective function is applied to the involved devices can be adjusted by a suitable threshold value adjustment.

The advantages of the invention are a maximally interference-free measuring operation of the non-preferred locating device and minimal interference to preferred radio communication services during the simultaneous use of a frequency spectrum.

Further advantages of the method according to the invention and electro-optical devices adjusted by means of said method result from the following drawings as well as from the associated description.

A typical application situation as well as an exemplary embodiment of the method according to the invention is depicted in the drawings. The description, the associated figures as well as the claims contain numerous characteristics in combination. A specialist in the field will consider said characteristics, particularly also the characteristics of different exemplary embodiments, individually and put them together in other meaningful combinations.

BRIEF DESCRIPTION OF THE DRAWINGS

The following are shown.

DETAILED DESCRIPTION

Figure 1:
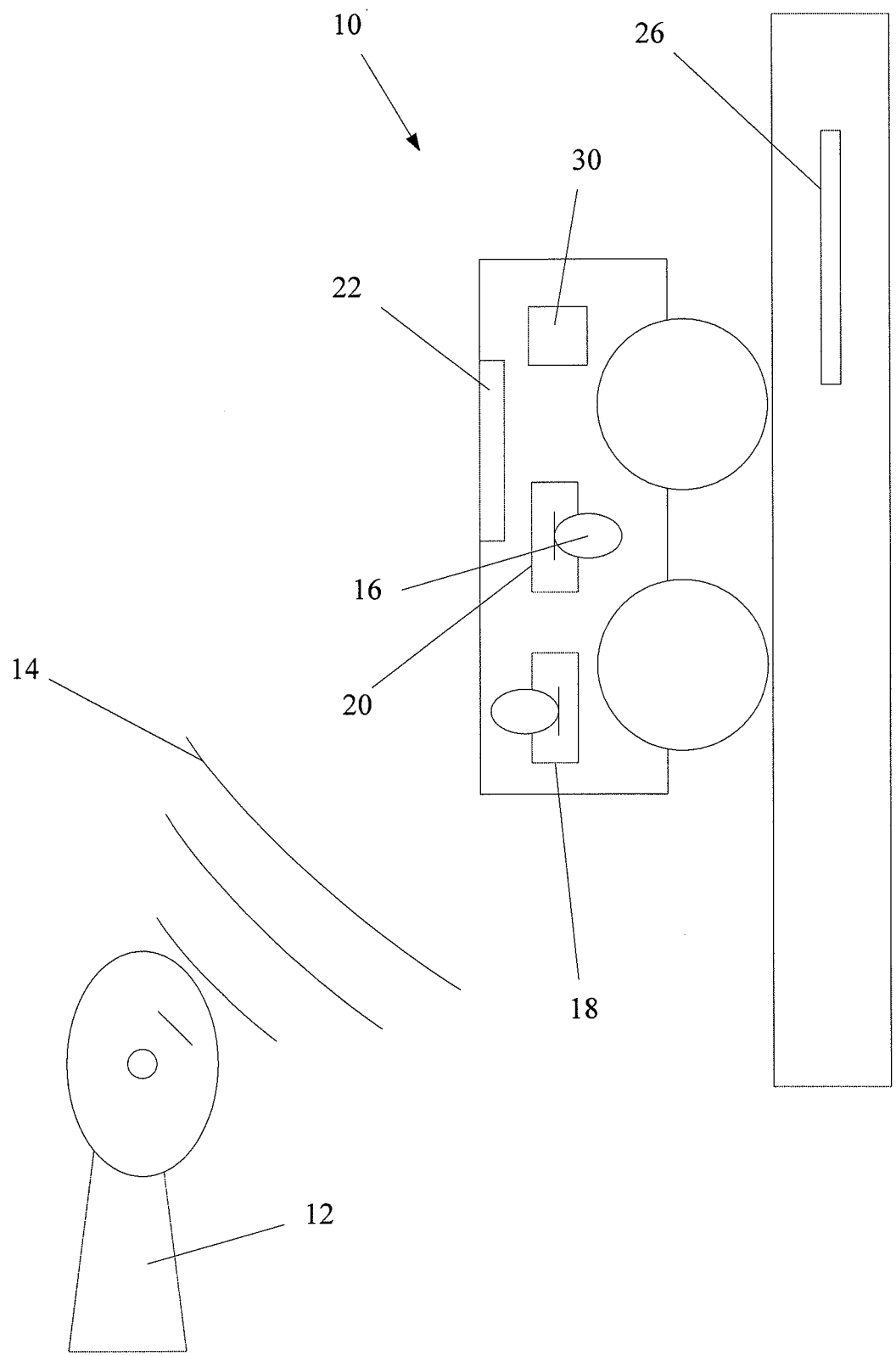
FIG. 1 a measuring situation, on which the method according to the invention is based,
FIG. 2 an exemplary embodiment of the method according to the invention in a schematic depiction.

FIG. 1 shows a typical application situation, on which the method according to the invention is based. An electrical device 10, particularly a locating device for identifying objects 26, in a medium, as, for example, a wall, a floor, a ceiling or a building material, which during operation emits electromagnetic radiation in the high frequency range, i.e. frequencies in the range of approximately 1 GHz to approximately 20 GHz, is operated in the vicinity of a radio communication service 12, as, for example, an emitter, an external radiation source, an external radio communications service or a radio telescope. In so doing, the electrical device can be interfered with by the radio communications service or can itself interfere with said radio communications service. The identification of said radio communications service can occur in principle prior to or during the emission of a radio signal by the electrical device or during a pause in emission by said device.

The electrical device 10, which is a locating device in the exemplary example of FIG. 1, includes a detection unit 20 having a UWB antenna 16 for emitting (emitter) and detecting (receiver) a measuring signal in order, for example, to detect objects enclosed in a medium. As an alternative, the emitting antenna and the receiving antenna of the measuring and detecting unit 20 can also be separate. Furthermore, said device 10 includes according to the embodiment of FIG. 1 at least one other additional dedicated receiver 18 for detecting the radiation emitted by a radio communications service 12, as, for example, an external radiation source, an external radio communications service or a radio telescope. In alternative embodiments, a detection of the external radio communications service can occur via the antenna 16 of the measuring and detecting unit 20 for the detection of enclosed objects.

The method according to the invention now makes the interference-free operation of the electrical device possible.

Figure 2:
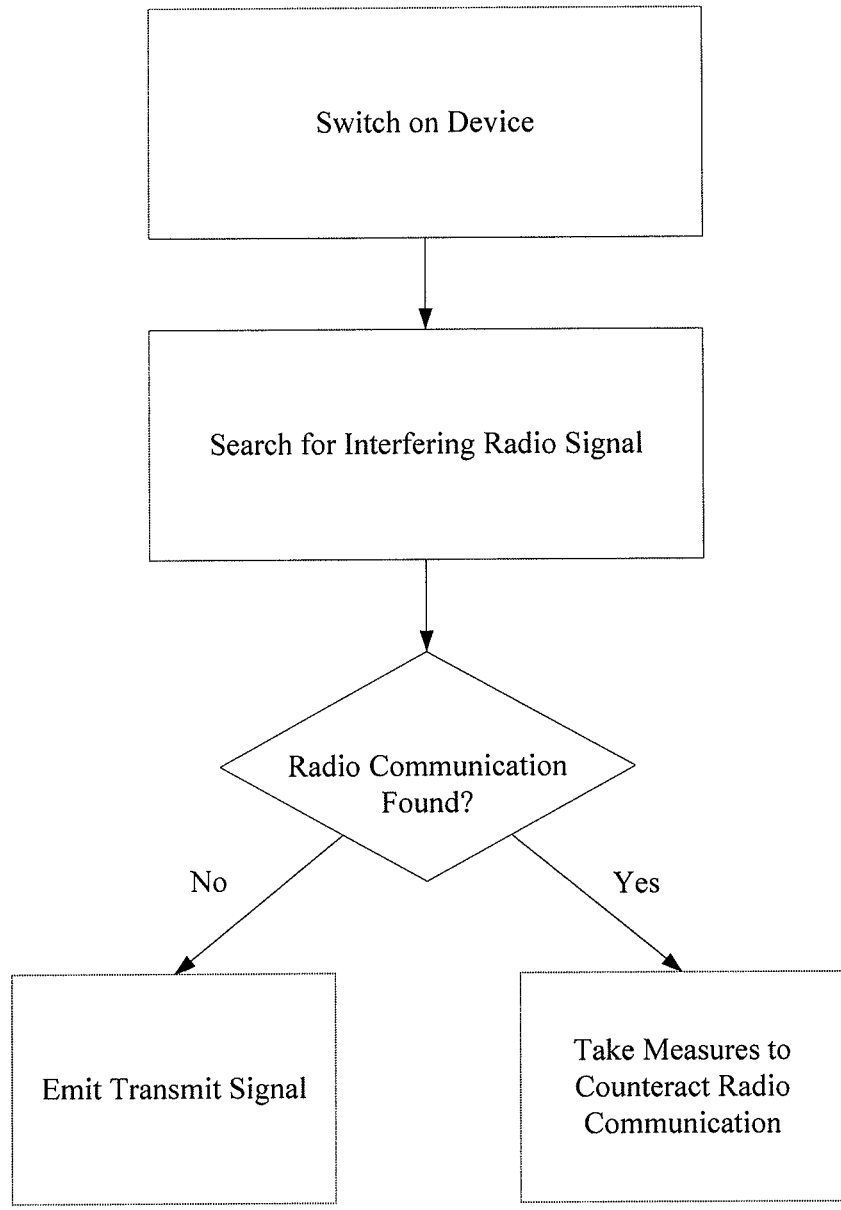

In the case of the method according to the invention, particularly the electrical device 10 working according to said method, a search is made for potential interferers 12 or radio communication services possibly interfered with by the radio signal (see procedural step II in FIG. 2) after switching on said device (procedural step I in FIG. 2) but prior to or during the emission of a radio signal (e.g. radar signal of a locating device) or during a pause in emission of the emitter of the detection unit 20.

This occurs, for example, as a result of the relevant useful frequency range of the UWB locating device being searched for active radio communication services 12. If no active radio communications service is in the vicinity, the locating device can emit its transmit signal with full (allowed) power (procedural step III according to FIG. 2); while in the case of an interfering radio communication service 12, measures must be taken on the one hand not to disturb said radio communication service during its reception phase and on the other hand an appropriate measure must be taken to counteract the influence of the preferred radio communication service on the measuring process of the locating device under consideration (procedural step IV in FIG. 2). This can, for example, include reducing the emitted power of the electrical device or even periodically switching off the emitter of said electrical device.

The different identification modes for a radio communications service are discussed below in detail, as they can be used in the method according to the invention.

A) Identification of a Radio Communication Service During Signal Emission

If a radio communication service 12 is active in the vicinity of the locating device 10 while said device is emitting signals, said locating device 10 thus receives, for example, with the antenna of its detection unit 20 an overlapping of its own (reflected) transmit signal with a signal 14 of the radio communication service 12. The presence of said radio communication service 12 can be detected as a result of the reception spectrum of said locating device being considerably altered in its form with respect to the normal case without said radio communication service 12. The reason for this is particularly that said radio communication service 12 adds a lot of power to the reception spectrum in a narrow frequency range.

The reference spectrum, with which the current reception spectrum is compared, can thereby be obtained in different ways:

a) fixedly stored in the device b) by averaging the reception signal over an extended period of time, possibly with the exclusion of extreme values, which, e.g., result from interferers c) by an internal reference network (e.g. an internal short circuit network 30), which internally reflects the transmit signal and said signal thereby moves into the reception branch. In so doing, it is advantageous to install an attenuator in front of the short circuit in order to attenuate reciprocating waves caused by mismatch. Furthermore, the obtained result can be correspondingly converted in order to take into consideration elements possibly not earlier taken into account (specifically antenna characteristics).

An additional option is to use dedicated receivers 18 for the external radio communication services being monitored, as this is depicted in the exemplary embodiment of FIG. 1. These receivers 18 are then able to, for example by having narrow bandwidth, detect certain radio communication services with great sensitivity and selectivity.

If an interferer 12 has been detected, the current measurement can be declared void from a specified degree of interference. The operator must then if need be move across the desired measurement range up until a sufficient number of valid measurements have been taken for all spatial positions. It can accordingly be shown in the display of the electrical device 10 or by means of LEDs whether the measurement range should once again be run over with the locating device. As an alternative, the spatial positions, for which an insufficient number of valid values are present, can be indicated in the display as invalid.

A further option for identifying the interferer consists of observing the change in the frequency spectrum while a measurement is taken with the device stationary (constant spatial position—but nevertheless emitting signals). If the spectrum changes at different frequencies, frequency bands or the total amplitude changes although said device is not moved, an external interference is thus to be assumed.

B) Search for Radio Communication Services During Pauses in the Signal Emission

The search for radio communication services 12 is easier when the emitter of the detection unit 20 is switched off than when the electrical device 10 is emitting signals. An observation of the reception power is hereby sufficient in the simplest case. It is useful to search for radio communication services 12 prior to switching on the emitter of the detection unit 20. When measuring, the emitter of the detection unit 20 can be switched off at regular or dynamic intervals, and a search can be made for said radio communication services 12, which were possibly not present prior to signal emission or are in the meantime no longer present. When dynamic interval control is used, the interval can be changed depending on whether a radio communication service has already been detected or not.

It is furthermore useful to leave the receiver activated during gaps in measuring or to activate said receiver in regular or dynamic intervals in order to search for radio communication services in the surrounding area. A gap in measuring can, e.g., thereby occur if the user moves over a location, at which a sufficient number of measurements have already been taken.

When a radio communication service has been detected, this can generally be communicated, or indicated, to the operator of the electrical device via a display, a noise or by means of light signals. When a known radio communication service is detected (e.g. UMTS mobile telephone), the operator can be informed as to which interferer is involved in order to, as the case may be, take corrective action (e.g. switching off a cellular telephone).

The operator can thereby distinguish between the case where the measuring procedure can be continued and the case where the emitter must be switched off in order to not interfere with the radio communication service. It is advantageous in the latter case depending on the user setting to leave the receiver switched on and to indicate to the operator with the aid of a signal (light, sound) if it is possible to continue on with said measuring procedure.

The invention claimed is:

1. Method for operating an electrical device which during operation at least temporarily emits electromagnetic radiation using an ultra wideband emitter, wherein the electrical device comprises a locating device for identifying objects in a medium, the method comprising:
   detecting the presence of an interfering signal from an external radiation source or an external radio communication service while the emitter of the electrical device is emitting electromagnetic radiation,
   communicating the presence of the detected interfering signal to the operator via a display and/or acoustically; and
   modifying the operation of the electrical device in response to the detection of the detected interfering signal by;
   a) reducing the emitted power of the electrical device with the emitter on or switching off the emitter of the electrical device in response to the detection of the detected interfering signal;
   b) continuously monitoring the detected interfering signal while the emitted power of the electrical device is reduced or the emitter is off; and
   c) then restoring the emitted power of the electrical device or switching on the emitter when the detected interfering signal is no longer detected.

2. The method according to claim 1 wherein the presence of an external radiation source or the external radio communication service is detected with the aid of a receiving antenna of the electrical device.

3. The method according to claim 1, wherein the presence of the external radiation source or the external radio communication service is detected by detecting an altered reception spectrum of the electrical device caused by the external radiation source or the external radio communication service while the electrical device is held stationary.

4. The method according to claim 1 wherein the presence of the external radiation source or the external radio communication service is detected by at least one additional dedicated receiver for the external radiation source or the external radio communication service.

5. The method according to claim 1, wherein a comparison of at least two frequency spectra is carried out for detecting the external radiation source or the external radio communication service.

6. The method according to claim 1, wherein at least one current reception spectrum of the electrical device during operation is compared with a reference spectrum.

7. The method according to claim 6, wherein the reference spectrum, with which the current reception spectrum of the electrical device is compared, is stored in said electrical device.

8. The method according to claim 6, wherein the reference spectrum, with which the current reception spectrum of the electrical device is compared, is generated by averaging the reception signal of the electrical device over an extended period of time.

9. The method according to claim 8, wherein the reference spectrum, with which the current reception spectrum of the electrical device is compared, is generated by averaging the reception signal of said electrical device over an extended period of time, extreme values, which result from the external radiation source or the external radio communications service, being excluded.

10. The method according to claim 6, wherein the reference spectrum, with which the current reception spectrum of the electrical device is compared, is generated by an internal reference network of said electrical device, particularly by an internal short circuit network.

11. A method for operating an electrical device which during operation at least temporarily emits electromagnetic radiation using an ultra wideband emitter, wherein the electrical device comprises a locating device for identifying objects in a medium, the method comprising:
   detecting the transmission of an interfering signal from an external radiation source or an external radio communication service while the emitter of the detection unit of the electrical device is switched off;
   communicating the presence of the detected interfering signal to the operator via a display and/or acoustically; and
   continuously monitoring the detected interfering signal while the electrical device is off; and
   then switching on the emitter when the detected interfering signal is no longer transmitting.

12. The method according to claim 11, wherein the reception power of the electrical device is measured.

13. The method according to claim 1, wherein the identification of an external radiation source or an external radio communication service is transmitted to the operator.

14. Electrical device comprising a locating device for detecting objects enclosed in a medium, having at least one UWB sensor, operated with a method according to claim 1.

* * * * *